(No Model.)
W. STANLEY, Jr.
SYSTEM OF ELECTRICAL DISTRIBUTION.
No. 469,809. Patented Mar. 1, 1892.
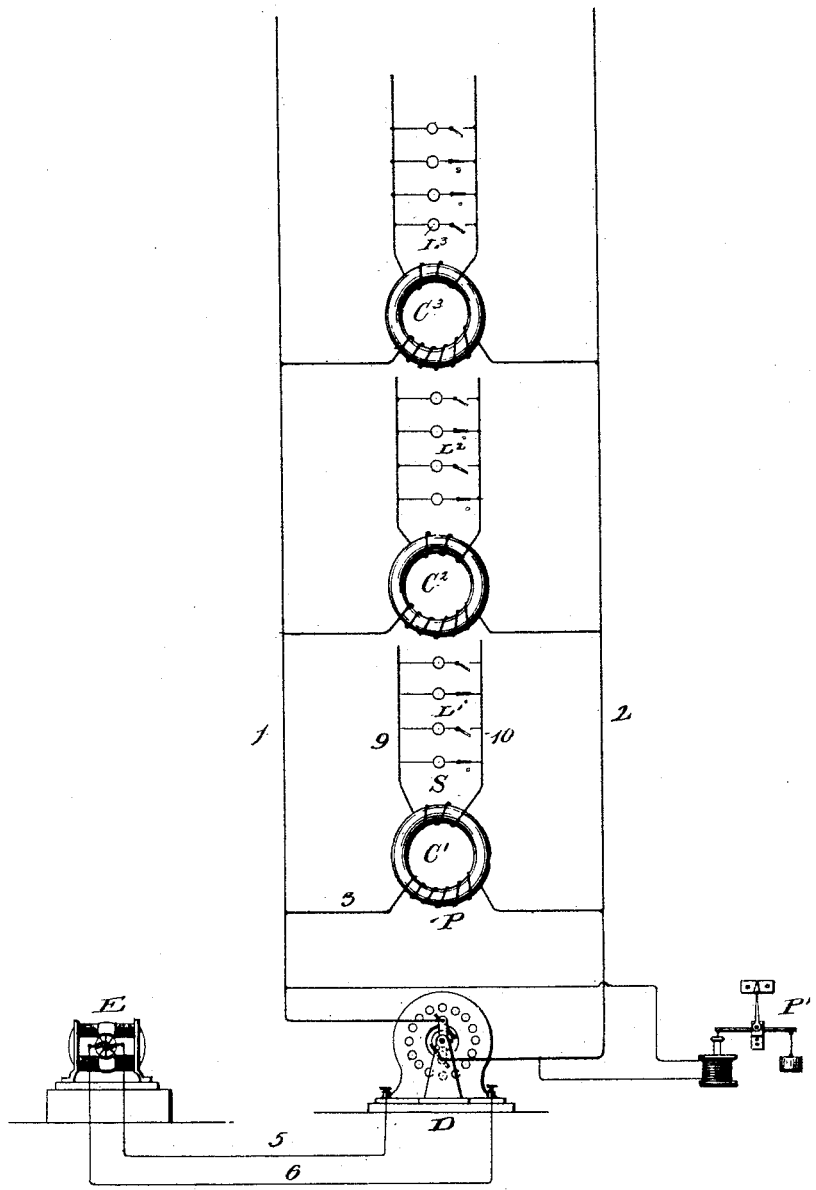
Witnesses:
L. C. Hills
E. H. Bond.
Inventor
William Stanley, Jr.
by Marcellus Bailey
Attorney

UNITED STATES PATENT OFFICE.

WILLIAM STANLEY, JR., OF GREAT BARRINGTON, MASSACHUSETTS, ASSIGNOR, BY MESNE ASSIGNMENTS, TO THE WESTINGHOUSE ELECTRIC AND MANUFACTURING COMPANY, OF PITTSBURG, PENNSYLVANIA.

SYSTEM OF ELECTRICAL DISTRIBUTION.

SPECIFICATION forming part of Letters Patent No. 469,809, dated March 1, 1892.

Application filed August 15, 1888. Serial No. 282,808. (No model.)

*To all whom it may concern:*

Be it known that I, WILLIAM STANLEY, Jr., a citizen of the United States, residing at Great Barrington, in the county of Berkshire, State of Massachusetts, have invented certain new and useful Improvements in Systems of Electrical Distribution, (Case 227,) of which the following is a specification.

My invention relates to a system of distribution of electricity for industrial and economical uses, with special adaptation to incandescent electric lighting, although it is applicable also to other purposes.

For simplicity of illustration I shall describe in this specification the application of the invention to incandescent lighting only. I employ for this purpose a dynamo-electric machine generating an alternating current and a number of induction-coils or converters organized to transform the current which is in the main line, at or near the points of consumption, from one potential to another—namely, a greater or less potential or to the same potential—in a secondary circuit. In this secondary circuit incandescent lamps or other translating devices are included.

In the accompanying drawing there is shown in diagram an organization of the apparatus illustrating the invention.

Referring to the drawing, D represents a dynamo-electric machine, of any suitable construction, generating an alternating electric current. The field-magnets of this machine are energized from any suitable source of continuous currents—as, for instance, the direct-current generator E, having its respective poles or terminals connected with the coils of the generator by the conductors 5 and 6. From the terminals of the alternating-current dynamo D extend the main lines 1 and 2. The primary coils of converters C' C² C³ are connected at any required points between these main lines in multiple arc. From the terminals of the secondary coils of these converters extend conductors 9 and 10, between which are attached translating devices L' L².

At any suitable point between the main lines 1 and 2 there is connected a potential-indicator P' of any suitable character.

The factors of the operation of my system of distribution are employment of an alternating-current generator supplying currents of approximately constant potential, main lines extending throughout the system of distribution, converters or transformers connected thereto, and translating devices located in the secondary circuits of the transformers, by the employment of which a sympathetic relation exists between the different operations of the system to the end of maintaining a simple and accurate self-regulation, so that the absorption of energy by the generator is proportional to the energy usefully consumed. The current developed by the dynamo D may be of as high potential as desired. In practice I have found it convenient to employ a potential of a thousand volts and to maintain that pressure as constant as possible during the operation of the apparatus.

In the drawing I have shown converters with closed magnetic circuits, the primary circuits of which are permanently connected with the main lines. These converters may be of any construction; but are preferably constructed to have the greatest magnetic conductivity in their magnetic circuits.

There are certain principles of construction which must be adhered to in the proportioning of the parts of the converter in order to secure the desired results and which I will now state. It is necessary in the first place that the conductivity for magnetic force of the magnetic circuit of the converter shall be of so great value that when subject to all degrees of magnetization accruing from the various amounts of energy transformed its conductivity for magnetic force would be approximately the same. This point of construction is important for two reasons: First, the greatest economy of conversion is obtained when the rise and fall of magnetism in the core is proportional as nearly as possible to the rise and fall of the current in the primary coil, and this condition is attainable only by keeping the core far below the saturation-point, and, second, the same condition secures the largest possible counter electro-motive force in the primary coils of the converters. This is indispensable for regulation, as hereinafter set forth. It is impossible to state the exact relation between the weight of the core and the strength of the current. I have found the minimum amount of iron necessary to produce satisfactory results to be one pound of iron for every twenty-five watts, which amount is equivalent to two pounds of iron per lamp with the lamps heretofore generally used by me. Thus in constructing a converter designed to supply twenty incandescent lamps I use a core weighing about forty pounds.

The lamps are extinguished by suitable switches without introducing any resistance in their place.

In the construction of the coils P and S the following principles are to be observed: The first thing to be determined is the length of the primary wire. This should be of such length that reacting self-inductively upon its own magnetic circuit the average counter-potential so produced approximately equals the potential applied to the primary circuit. When so constructed, an ammeter will practically show no current when the secondary circuit is open. To obtain these results in practice I use the following method: I first choose the percentage of efficiency to be obtained. Then having selected a type of magnetic circuit affording as great magnetic conductivity as possible I apply such a length of primary conductor that acting self-inductively upon its core the difference of the counter-potential and applied potential multiplied by the current in the converter shall equal the predetermined loss of energy inevitable in conversion and vary the length of primary wire until the desired results are attained. It is obvious that the coefficients of induction in the dynamo and armature and converter may be made equal by energizing each circuit with the same induction.

In the carrying out of my invention it is possible to use the same coefficients of induction in the armature and the dynamo as are present in the primary circuit of the converter; but this equality is not necessary. Having by these means determined the length of the primary coil, the secondary is adapted to it in such a manner as to secure the desired potential according to the well-known laws affecting the operation of induction-coils. I have usually related the potential of the secondary to the primary in the ratio of twenty to one. The size of the wire in the primary and secondary coils is in inverse proportion to their electro-motive forces.

The operation of the apparatus is as follows: First, the potential in the main line is kept constant at the point taken as the normal pressure of the system, that being preferably, as I have said, one thousand volts. In the normal operation of the apparatus there will be found to be but little variation from this and consequently rare need of any considerable regulation of the dynamo; but for such regulation as may be required the most convenient means is to vary the strength of the field in the dynamo D by increase or diminution of the strength of the current from the exciter E. This may be accomplished by the use of a shunt-wound field and variable resistance in the circuit of the exciter or by any other method. The pressure-indicator P, placed across the poles of the dynamo by the conductors 7 and 8, shows the potential in the line, and it is the duty of the attendant to regulate the dynamo by it. The amount of current taken from the main conductors by each converter will be proportional to the work done by its secondary under full load, and the distribution calculations are all made with reference to this condition. When the apparatus is put in operation with all its lamps burning the current is distributed among them equally by equalized resistance, as in the case of a system of lighting by direct currents. It is when part of the lamps are extinguished from time to time here and there, as the convenience of users may require, that the particular superiority of my system appears in its perfect self-regulation, both of the distribution of the current among the lamps that remain and of the load on the dynamo, and this is brought about in this way: The primary coil of the converter operates to produce by induction a certain phase of magnetism or succession of magnetic impulses in its core, and by these a current is induced in the secondary coil. The current in the secondary coil thus induced reacts upon the core and induces in it a phase of magnetism or succession of magnetic impulses exactly contrary to those induced by the primary coil, so that in effect the primary current acts as a magnetizing and the secondary current as a demagnetizing influence upon the core. With the parts of the apparatus properly proportioned and all the lights in the secondary burning these antagonizing influences upon the core are approximately equal. Upon the cutting out of a lamp in the secondary the resistance of the secondary circuit is increased and at the same time its current is diminished. This diminution of current diminishes the demagnetizing power of the secondary, and as one lamp after another is cut out the demagnetizing power of the secondary continues to decrease until, when all the lamps are cut out and the secondary circuit open, its demagnetizing power is *nil*. As this process goes on the magnetic conductivity of the core increases, because it is not opposed by the counter-magnetism of the secondary circuit, and consequently the self-induction or counter-potential of the primary circuit increases until the counter and applied potentials in the primary coil are approximately equal. The apparent effect of this is to diminish the current proportionally, not only in the primary coil of the converter and in the cross-wires that lead to it, but in the main line as well at all points between the intersections of the conductors of that converter and the dynamo. At the same time the strength of the current in the other converters of the system and the operation of the lamps in their secondaries remain substantially unaffected. The effect of this apparent reduction of current strength is to reduce in approximate proportion the load on the dynamo and on the motive power.

I claim—

1. In a system of electrical distribution, and in combination, an alternating-current dynamo and converters electrically connected with the main-line conductors in multiple arc and organized to transform the current in the main conductors into currents of less potential and greater quantity in the secondaries, each converter made with a primary coil containing such length of wire exposed to magneto-electric induction that when operated by the dynamo with which it is to be used with its secondary circuit open the electrical pressure and counter-pressure in its primary circuit shall be equal with incandescent lamps or other translating devices in the secondary circuits, substantially as and for the purposes set forth.

2. In a system of electrical distribution, and in combination, an alternating-current dynamo and converters organized to transform the current in the main conductors into currents of less potential and greater quantity in the secondaries electrically connected with the main conductors in multiple arc, the dynamo and the converters of the system so adjusted to each other by mutual adaptation of their magnetic fields and the lengths of wire upon the armature of the dynamo and the primary coils of the converters, respectively, that when supplied with the full normal current of the dynamo, the secondary circuits of the converters being open, the electrical pressure and counter-pressure in their primary circuits shall be approximately equal with incandescent lamps or other translating devices in the secondary circuits, substantially as and for the purposes set forth.

3. In a system of electrical distribution, and in combination, an alternating-current dynamo and converters organized to transform the current generated by the dynamo into currents of less potential and greater quantity at or near the points of consumption electrically connected with the main-line conductors in multiple arc and having their primary circuits constantly closed, each converter adapted to the dynamo operating the system by making its primary coil of such length that when supplied with its full proportionate share of the entire normal electro-motive force of the machine, its secondary circuit being open, the electrical pressure and counter-pressure in its primary circuit shall be approximately equal with translating devices in the secondary circuits of the converters to be cut out of the circuit when not in use without the introduction of any resistance in the place of them, substantially as and for the purposes set forth.

4. In a system of electrical distribution, and in combination, an alternating-current dynamo and converters organized to transform the current generated by the dynamo into currents of less potential and greater quantity at or near the points of consumption electrically connected with the main-line conductors in multiple arc and having their primary circuits constantly closed and their secondary circuits constantly open, except when and as closed through translating devices at work, each converter containing a soft-iron core weighing substantially one pound for each twenty-five watts normally produced in its secondary circuit and adapted to the dynamo operating the system by making its primary coil of such length that when supplied with its full proportionate share of the entire normal current of the machine, its secondary circuit being open, the electrical pressure and counter-pressure in its primary circuit shall be equal, with incandescent lamps or other translating devices in the secondary circuits, substantially as and for the purposes set forth.

5. In a system of electrical distribution, and in combination, an alternating-current dynamo and converters organized to transform the current generated by the dynamo into currents of less potential and greater quantity at or near the points of consumption electrically connected with the main-line conductors in multiple arc and having their primary circuits constantly closed and their secondary circuits constantly open, except when and as closed through translating devices at work, each converter containing a soft-iron core weighing substantially one pound for each twenty-five watts normally produced in its secondary circuit, whose primary coil is subjected to effective magnetic induction substantially equal to the effective magnetic induction influencing the armature-wire of the dynamo operating the system, with incandescent lamps or other translating devices in the secondary circuits, substantially as and for the purposes set forth.

In testimony whereof I have hereunto subscribed my name this 13th day of August, A. D. 1888.

WILLIAM STANLEY, Jr.

Witnesses:
C. C. WOLFE,
CHARLES A. TERRY.